(12) United States Patent
Xu (10) Patent No.: US 9,559,584 B2
(45) Date of Patent: Jan. 31, 2017

(54) ELECTRIC CIRCUIT OF A SWITCHABLE CURRENT SOURCE

(71) Applicant: ams AG, Unterpremstaetten (AT)

(72) Inventor: Gonggui Xu, Plano, TX (US)

(73) Assignee: AMS AG, Unterpremstaetten (AT)

( * ) Notice: Subject to any disclaimer, the term of this patent is extended or adjusted under 35 U.S.C. 154(b) by 0 days.

(21) Appl. No.: 14/423,100

(22) PCT Filed: Jul. 23, 2013

(86) PCT No.: PCT/EP2013/065509
§ 371 (c)(1),
(2) Date: Feb. 20, 2015

(87) PCT Pub. No.: WO2014/029573
PCT Pub. Date: Feb. 27, 2014

(65) Prior Publication Data
US 2015/0244260 A1    Aug. 27, 2015

Related U.S. Application Data

(60) Provisional application No. 61/692,564, filed on Aug. 23, 2012.

(30) Foreign Application Priority Data

Aug. 28, 2012  (EP) ..................... 12182037

(51) Int. Cl.
*G05F 1/56* (2006.01)
*H05B 33/08* (2006.01)
(Continued)

(52) U.S. Cl.
CPC .............. *H02M 3/156* (2013.01); *G05F 1/561* (2013.01); *H05B 33/0815* (2013.01)

(58) Field of Classification Search
CPC ............ H05B 33/0815; H05B 33/0818; H05B 33/0827; H05B 33/0845; G09G 3/3406; G09G 3/3416; G09G 2320/0626; G09G 2330/021; G09G 2330/12; G05F 1/561; H02M 3/156
(Continued)

(56) References Cited

U.S. PATENT DOCUMENTS

| | | | |
|---|---|---|---|
| 7,071,630 B1 * | 7/2006 | York ................... | H05B 33/0815 315/224 |
| 2002/0105373 A1 * | 8/2002 | Sudo .................. | H05B 33/0818 327/538 |

(Continued)

FOREIGN PATENT DOCUMENTS

| JP | WO 2008137674 A2 * | 11/2008 | ........... G09G 3/3406 |
|---|---|---|---|
| WO | 2008/137674 A2 | 11/2008 | |

*Primary Examiner* — Dylan White
(74) *Attorney, Agent, or Firm* — McDermott Will & Emery LLP (57) ABSTRACT

An electric circuit of a switchable current source (10) comprises an input path (IP) comprising a first resistor (R1) and a controllable current source (CS) to provide a changeable current (Itrim) and an output current path (OP) including a controllable output driver (MN), a second resistor (R2) and an output terminal (LDR_PIN). A sensing voltage (VSENSE) is tapped at the output current path (OP) and is fed back to a regulator circuit (RC) by a feedback path (FP). The regulator circuit (RC) is connectable to the input path (IP) and the output path (OP) and provides an output signal (Vout2) to control the output current driver (MN). The switchable current source (10) enables to provide an output current (ILDR) at the output terminal (LDR_PIN) in dependence on the first and second resistor (R1, R2) and the changeable current (Itrim).

14 Claims, 6 Drawing Sheets

(51) Int. Cl.
*G09G 3/34* (2006.01)
*H02M 3/156* (2006.01)

(58) Field of Classification Search
USPC ........................................... 315/209 R
See application file for complete search history.

(56) References Cited

U.S. PATENT DOCUMENTS

| | | | | |
|---|---|---|---|---|
| 2003/0025120 | A1* | 2/2003 | Chang | H05B 33/0827 257/92 |
| 2010/0244790 | A1* | 9/2010 | La Rosa | H05B 33/0812 323/272 |
| 2010/0301762 | A1* | 12/2010 | Kung | G09G 3/3406 315/193 |
| 2011/0001433 | A1* | 1/2011 | Lee | H05B 33/0815 315/185 R |
| 2011/0234110 | A1 | 9/2011 | Liu et al. | |
| 2014/0232271 | A1* | 8/2014 | Wiegele | H05B 33/0815 315/127 |

* cited by examiner

ELECTRIC CIRCUIT OF A SWITCHABLE CURRENT SOURCE

TECHNICAL FIELD

The present invention is directed to an electric circuit of a switchable current source and an electric circuit of a current regulator and a module to provide a switchable light signal of a light emitting diode.

BACKGROUND

A switchable current source may be used in a wide field of applications from switched mode power supply to LED drivers. One particular application is that of optical proximity sensors. Optical proximity sensors require a special infrared LED driver which has to comply with requirements relating to a wide current trimming range to trim out infrared LED variation, a wide external voltage compliance for different mobile batteries and a fast response time to LED pulse input change for a synchronized proximity engine operation.

It may be desirable to provide an electric circuit of a switchable current source which may be switched fast and reliably to provide a pulsed output current. There is also a desire to provide an electric circuit of a current regulator to provide a fast and reliable sequence of output current pulses. Another desire is to provide a module to generate a switchable output signal which may be turned on and off between a high and low level in a fast and reliable manner.

SUMMARY

An embodiment of an electric circuit of a switchable current source is specified in claim 1. The electric circuit of the switchable current source may comprise an input current path with a controllable current source to feed a changeable current to the input current path, an output terminal to provide an output current, and an output current path being connected to the output terminal. The switchable current source may further comprise an regulator circuit having a first input terminal to apply a first input signal and a second input terminal to apply a second input signal and an output terminal to provide an output signal, wherein the regulator circuit is arranged to provide the output signal in dependence on the comparison of the first and second input signals. The circuit of the switchable current source may further comprise a controllable output driver being controlled in dependence on the output signal, wherein the controllable output driver is arranged to change the output current in dependence on the output signal, and a feedback path coupled between the output current path and the first input terminal. The first input terminal of the regulator circuit is connectable to the input current path and the feedback path, and the second input terminal of the regulator circuit is connectable to the input current path.

An embodiment of an electric circuit of a current regulator is specified in claim 12. The electric circuit of the current regulator may comprise the electric circuit of a switchable current source according to an embodiment as described above, a control circuit to control the electric circuit of the switchable current source by controlling the controllable switches of the switchable current source. The control circuit is arranged to switch the second and the third and the fourth controllable switches in a conductive state and to switch the first and the fifth and the sixth controllable switches in a non-conductive state during a first operational mode of the electric circuit of the switchable current source to generate the output current. The control circuit is arranged to switch the first and the second and the fifth and the sixth controllable switches in the conductive state and to switch the third and the fourth controllable switches in the non-conductive state during a second operational mode of the electric circuit of the switchable current source in which the output current is turned off.

Another embodiment of the current regulator circuit is specified in claim 13. The current regulator may comprise the electric circuit of a switchable current source as described above, and a control circuit to control the electric circuit of the switchable current source by controlling the controllable switches of the switchable current source. The control circuit is arranged to switch the third and the fourth and the seventh controllable switches in a conductive state and to switch the first and the second and the fifth and the sixth controllable switches in a non-conductive state during a first operational mode of the electric circuit of the switchable current source to generate the output current. The control circuit is further arranged to switch the third and the fourth and the seventh controllable switches in the non-conductive state and to switch the first and the second and the fifth and the sixth controllable switches in the conductive state during a second operational mode of the electric circuit of the switchable current source in which the output current is turned off.

A module to provide a switchable light signal of a light emitting diode, such as signal of an infrared light emitting diode, is specified in claim 14. The module may comprise an electric circuit of a switchable current source according to one of the embodiments described above, a light emitting diode, and a power supply terminal to supply power. The light emitting diode is connected between the output terminal of the electric circuit of the switchable current source and the power supply terminal.

It is to be understood that both the foregoing general description and the following detailed description present embodiments and are intended to provide an overview or a framework for understanding the nature and character of the disclosure. The accompanying drawings are included to provide a further understanding, and are incorporated into and constitute a part of this specification. The drawings illustrate various embodiments and, together with the description, serve to explain the principles and operation of the concepts disclosed.

DETAILED DESCRIPTION

Figure 1:
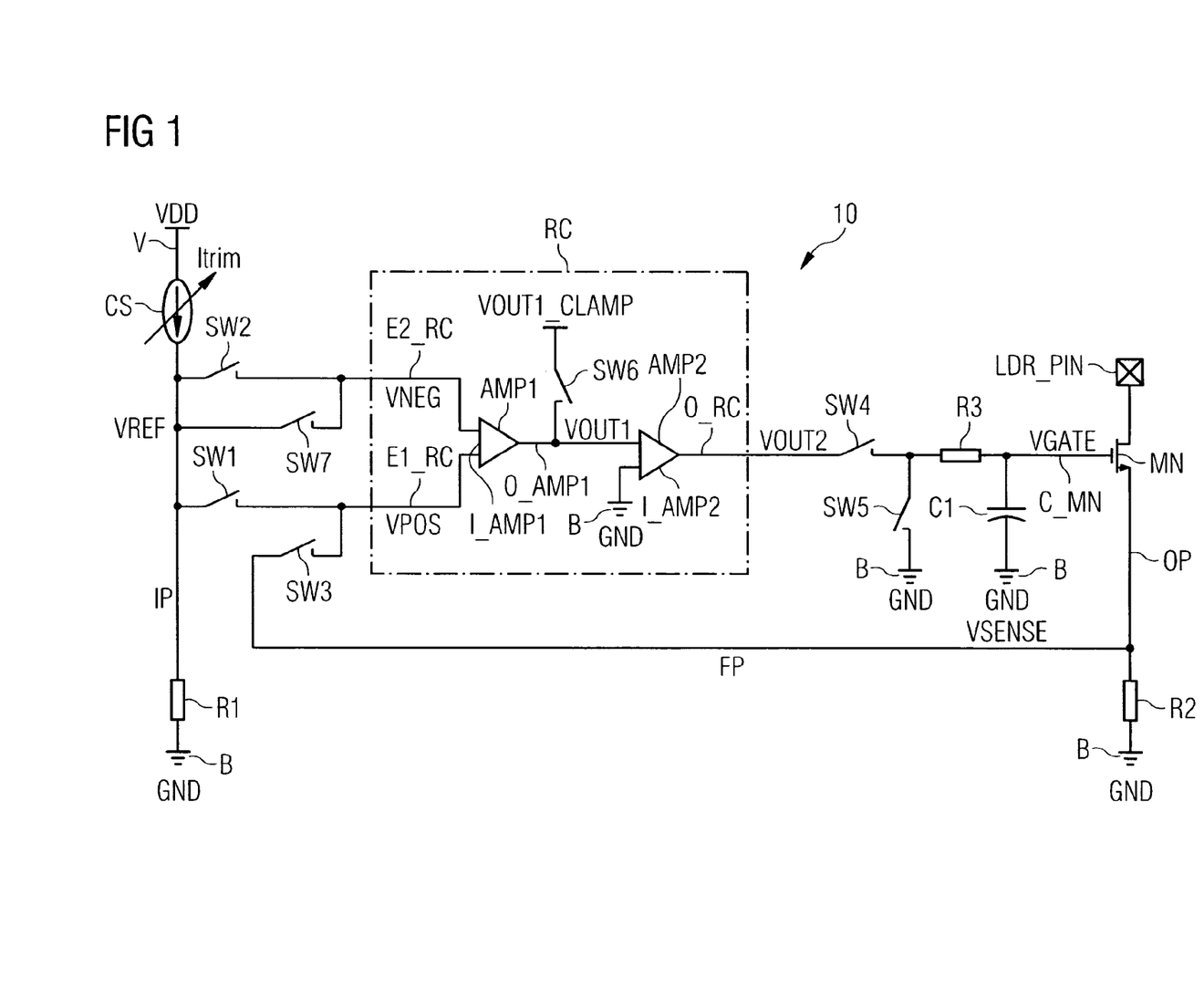
FIG. 1 shows an embodiment of an electric circuit of a switchable current source.

FIG. 1 shows an embodiment of an electric circuit of a switchable current source 10 comprising an input current path IP with a controllable current source CS to feed a changeable current Itrim to the input current path IP. The switchable current source further comprises an output terminal LDR_PIN to provide an output current ILDR and an output current path OP being connected to the output terminal LDR_PIN. The switchable current source comprises a regulator circuit RC having a first input terminal E1_RC to apply an input signal VPOS and an input terminal E2_RC to apply an input signal VNEG and an output terminal O_RC to provide an output signal VOUT2. The regulator circuit RC is arranged to compare the input signal VPOS with the input signal VNEG. The regulator circuit RC provides the output signal VOUT2 in dependence on the comparison of the input signals VPOS and VNEG. The regulator circuit generates the output signal VOUT2 as amplified difference between the input signals VPOS and VNEG.

The electric circuit further comprises a controllable output driver MN being controlled in dependence on the output signal VOUT2. The output driver MN is arranged to change the output current ILDR in dependence on the output signal VOUT2. The switchable current source further comprises a feedback path FP coupled between the output current path OP and the input terminal E1_RC. The input terminal E1_RC of the regulator circuit RC is connectable to the input current path IP and the feedback path FP, and the input terminal E2_RC of the regulator circuit RC is connectable to the input current path.

The input current path IP is connected between a supply potential VDD and a reference potential GND, e.g. a ground potential. The input terminals E1_RC, E2_RC of the regulator circuit RC are connectable to the input current path IP. Furthermore, a resistor R1 is arranged in the input current path IP such that a reference voltage VREF drops at the resistor R1, when the changeable current Itrim is fed in the input current path IP. The reference voltage VREF is dependent on the changeable current Itrim and the resistance of the resistor R1.

A controllable switch SW1 is connected between the input current path IP and the input terminal E1_RC to apply the reference voltage VREF tapped at the input current path IP to the input terminal E1_RC, when the controllable switch SW1 is switched in a conductive state. A controllable switch SW2 is connected between the input current path IP and the input terminal E2_RC to apply the reference voltage VREF to the input terminal E2_RC, when the controllable switch SW2 is switched in a conductive state.

A controllable switch SW3 is arranged in the feedback path FP to apply a sensing voltage VSENSE tapped at the output current path OP to the input terminal E1_RC. The output current path OP comprises a resistor R2. The resistor R2 is arranged in the output current path OP such that the sensing voltage VSENSE drops at the resistor R2. The sensing voltage VSENSE is fed back to the input terminal E1_RC of the regulator circuit RC, when the controllable switch SW3 is in a conductive state.

The electric circuit of the switchable current source comprises a controllable switch SW4 being connected between the output terminal O_RC of the regulator circuit RC and a control terminal C_MN of the output driver MN. The controllable output driver MN may be configured as a transistor with the control terminal C_MN. A resistor R3 is connected between the output terminal O_RC of the regulator circuit and the control terminal C_MN of the controllable output driver MN to apply a control signal VGATE. A capacitor C1 is connected between the control terminal C_MN of the controllable output driver and the reference potential GND. A controllable switch SW5 is connected between the control terminal C_MN of the controllable output driver and the reference potential GND such that the control terminal C_MN of the controllable output driver is applied to a ground potential via the resistor R3, when the controllable switch SW5 is switched in a conductive state.

The regulator circuit RC may be designed as a 2-stage-amplifier comprising a first amplifier AMP1 and a second amplifier AMP2. The first amplifier AMP1 has an input side I_AMP1 including the input terminals E1_RC, E2_RC and an output side O_AMP1 to provide a comparing signal VOUT1. The first amplifier AMP1 is arranged to compare the input signal VPOS and the input signal VNEG of the regulator circuit RC and to provide the comparing signal VOUT1 in dependence on the comparison of the input signals VPOS and VNEG of the regulator circuit RC. The first amplifier circuit generates the comparing signal VOUT1 as an amplified difference between the input signals VPOS and VNEG.

The second amplifier AMP2 has an input side I_AMP2 to apply the comparing signal VOUT1 and an output side O_RC to provide the output signal VOUT2. The second amplifier amplifies the comparing signal VOUT1 still any more in comparison to the amplification which has just been made by the first amplifier AMP1. The switchable current source further comprises a controllable switch SW6 being connected to a supply potential VOUT1_CLAMP to apply the supply potential to the input side I_AMP2 of the second amplifier AMP2.

The electric circuit of the switchable current source may further comprise a controllable switch SW7 being connected between the input current path IP and the input terminal E2_RC such that the reference voltage VREF is applied to the input terminal E2_RC, when the controllable switch SW7 is switched in a conductive state.

Figure 2:
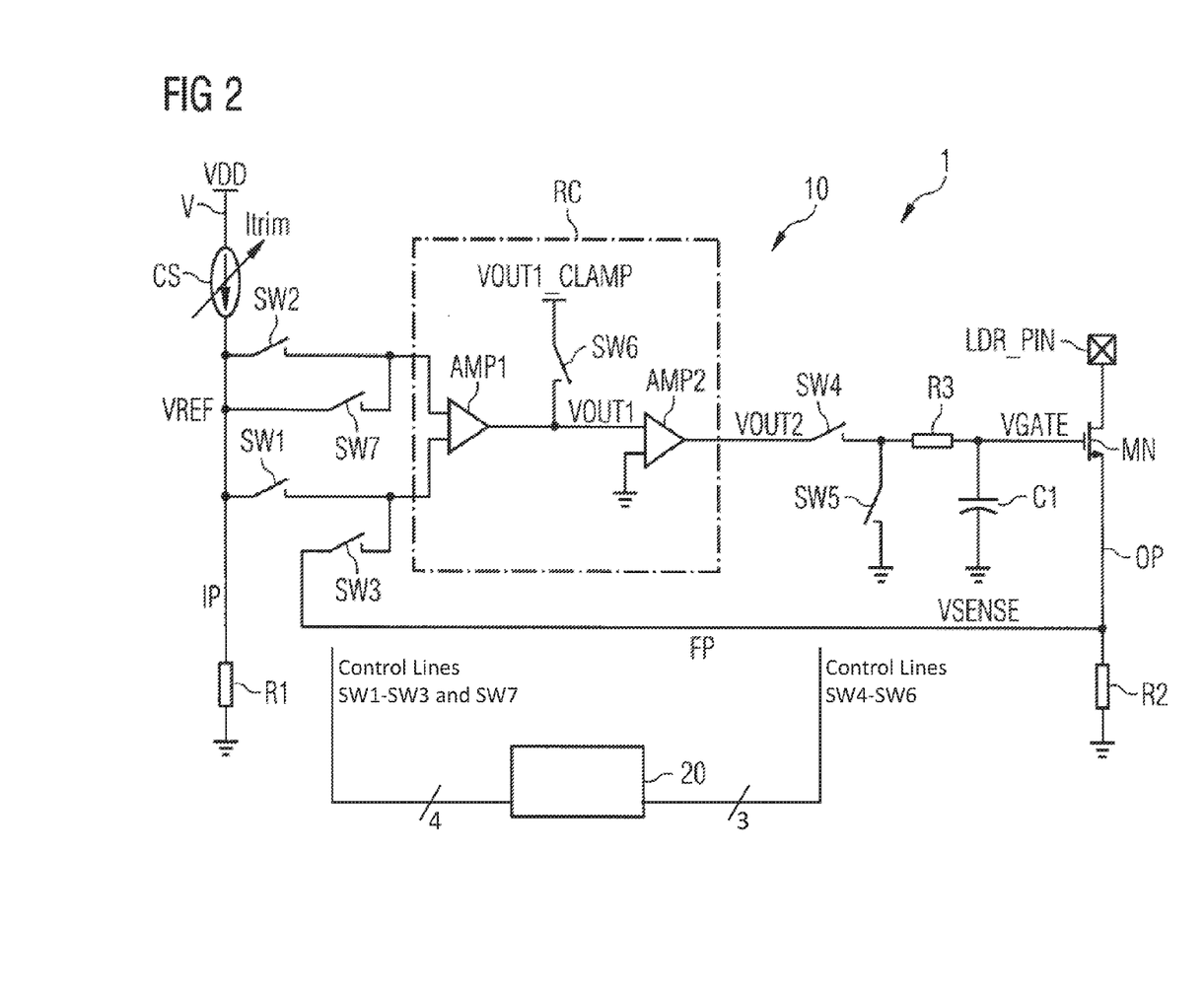
FIG. 2 shows an embodiment of an electric circuit of a current regulator.

FIG. 2 shows an embodiment of an electric circuit of a current regulator 1. The current regulator comprises the electric circuit of the switchable current source 10 as shown in FIG. 1 and additionally comprises a control circuit 20 to control the switchable current source 10 by controlling the controllable switches SW1, . . . SW7.

According to a first embodiment, the control circuit 20 may be arranged to switch the controllable switches SW2, SW3, SW4 in a conductive state and to switch the controllable switches SW1, SW5, SW6 in a non-conductive state during a first operational mode of the switchable current source to generate the output current ILDR. The control circuit 20 may be further arranged to switch the controllable switches SW1, SW2, SW5 and SW6 in the conductive state and to switch the controllable switches SW3 and SW4 in the non-conductive state to turn off the output current ILDR.

According to a second embodiment, the control circuit 20 may be arranged to switch the controllable switches SW3, SW4 and SW7 in a conductive state and to switch the controllable switches SW1, SW2, SW5 and SW6 in a conductive state during the first operational mode of the switchable current source to generate the output current ILDR. The control circuit 20 may be further arranged to switch the controllable switches SW3, SW4 and SW7 in a non-conductive state and to switch the controllable switches SW1, SW2, SW5 and SW6 in the conductive state during a second operational mode of the switchable current source in which the output current ILDR is turned off.

Figure 3:
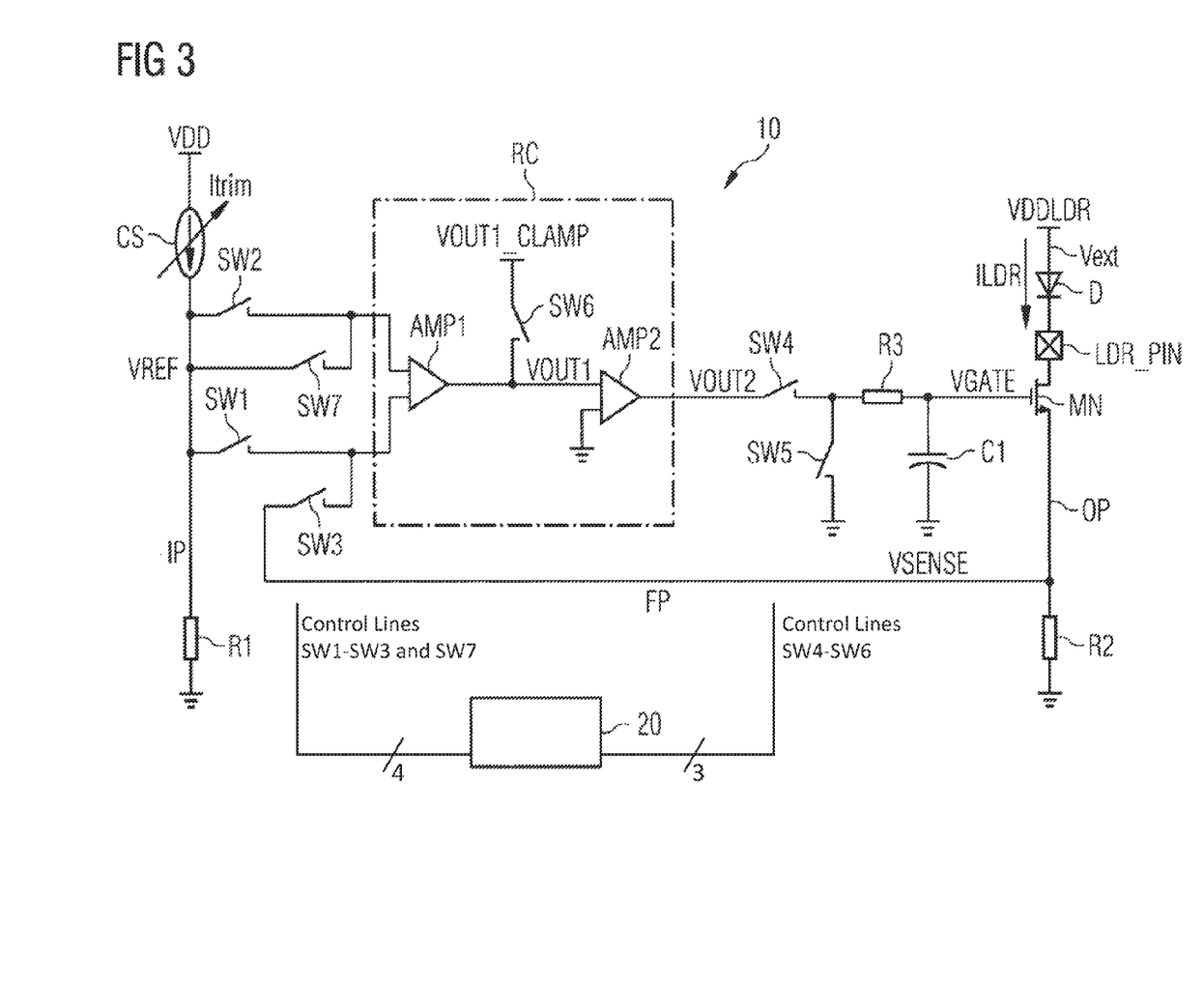
FIG. 3 shows an embodiment of a module to provide a switchable light signal.

FIG. 3 shows an embodiment of a module to provide a switchable light signal. The module comprises the electric circuit of the current regulator 1 as shown in FIG. 2 and additionally comprises a light-emitting diode D which may be formed as an infrared LED and a power supply terminal Vext to supply power VDDLDR. The light-emitting diode D is connected between the output terminal LDR_PIN of the switchable current source and the power supply terminal Vext.

Figure 4:
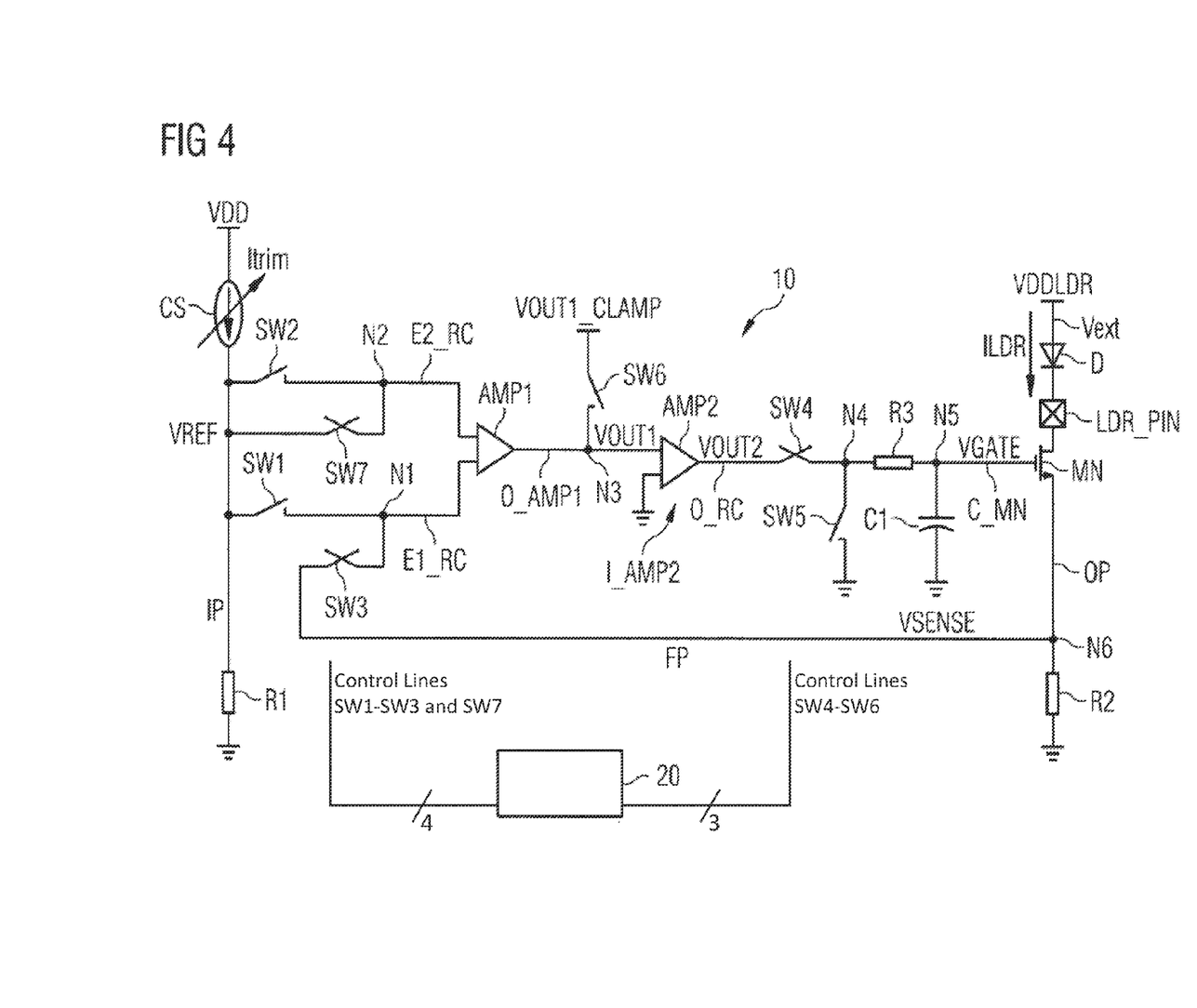
FIG. 4 shows an embodiment of the module to provide a switchable light signal in an on-state.

FIG. 4 shows the circuit configuration of the switchable current source in the first operational mode ("on state") to generate the output current ILDR. In the "on state" the controllable switches SW3, SW4 and SW7 are switched in a conductive state and the controllable switches SW1, SW2, SW5 and SW6 are switched in a non-conductive state. When operated in the "on state" the output driver MN provides a constant output current ILDR in the output current path OP. The output current ILDR is defined by the reconfigurable trimming current Itrim and the resistances of the resistors R1 and R2.

In this configuration, the output current ILDR through the driver transistor MN is monitored by the resistor R2 and is compared to the trimmed current Itrim through resistor R1. Since the regulator loop will drive the same voltages across the resistors R1 and R2, the output current can be derived as ILDR=Itrim×R1/R2. That means that the output current ILDR of the switchable current source is defined by the changeable trimming current Itrim multiplied by the ratio of the resistances of resistors R1 and R2. The equation of the output current shows that the circuit configuration of the switchable current source enables a wide trimming range which may be used for optical proximity applications.

Figure 5:
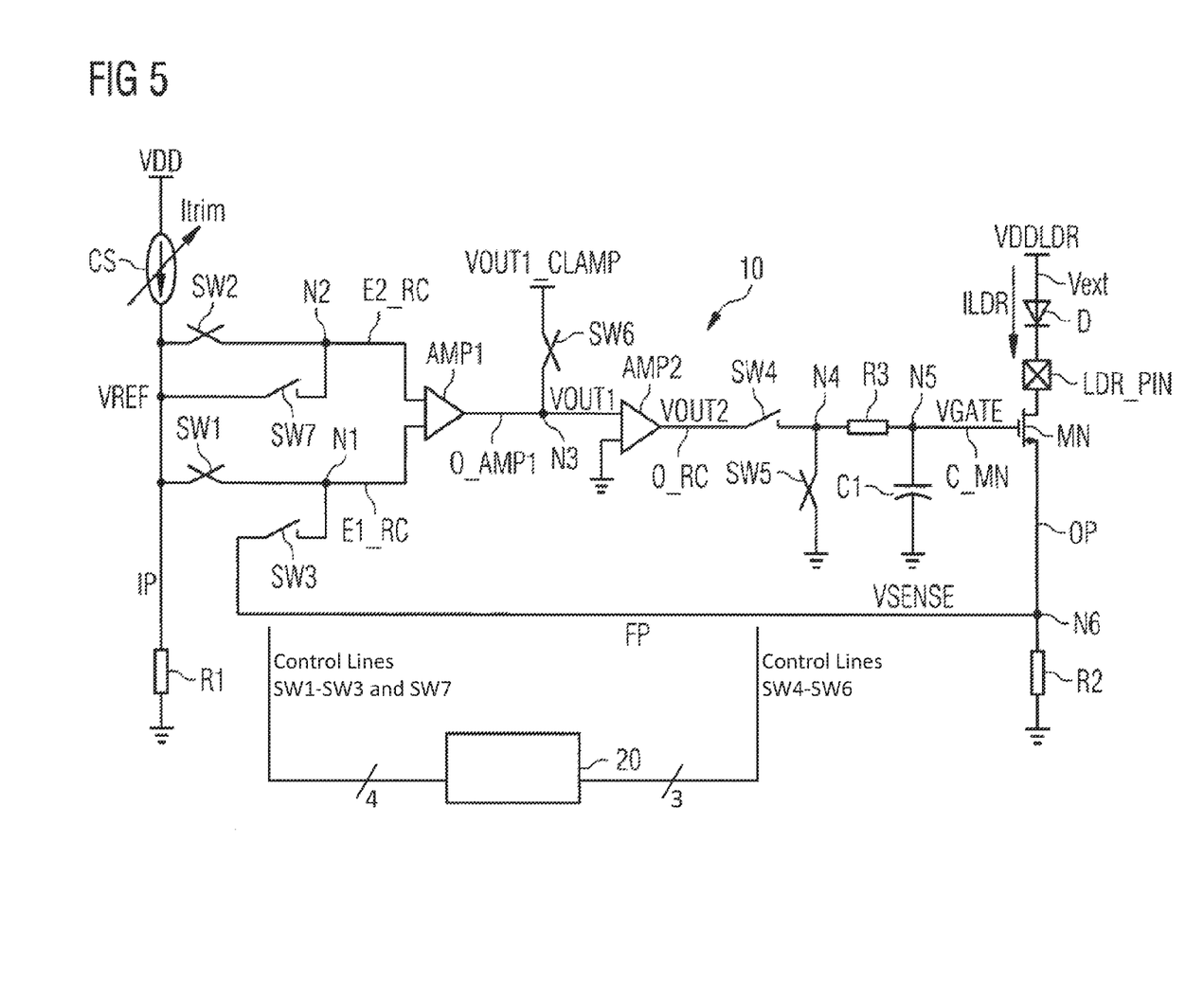
FIG. 5 shows an embodiment of a module to provide a switchable light signal in an off-state.

FIG. 5 shows the circuit configuration of the switchable current source in a second operational mode ("off state"), in which the generation of the output current ILDR is turned off. In the "off state" of the switchable current source the regulation loop is open. The controllable switches SW3, SW7 and SW4 are switched in a non-conductive state and the controllable switches SW1, SW2, SW5 and SW6 are switched in a conductive state. The controllable switch SW5 pulls the control terminal C_MN, i.e. the gate of the transistor MN of the output driver MN, to the ground potential GND through the resistor/capacitor R3/C1 in a slew controlled manner. Due to the conductive state of the controllable switches SW1 and SW2 the input terminals E1_RC and E2_RC of the regulator circuit RC or the first amplifier AMP1 are short-circuited together to the common mode reference voltage VREF which drops at the resistor R1. Although the regulator loop, i.e. the feedback path FP, is open, internal nodes N1, N2, N3, N4, N5 and N6 of the switchable current source are clamped such that the current source is set up ready for a smooth transition back from the second operational mode ("off state") to the first operational mode ("on state").

Figure 6:
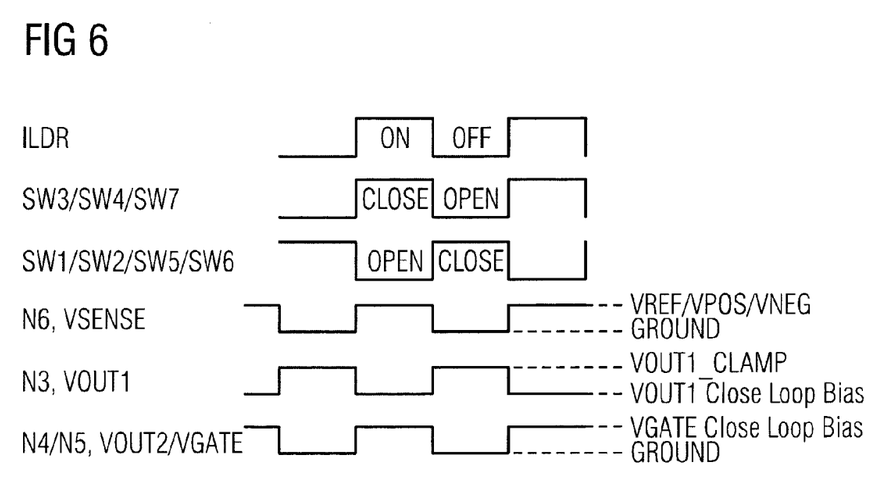
FIG. 6 shows a transition of states of signals and states of switches of the electric circuit of the switchable current source.

FIG. 6 shows a detailed diagram of the level of the output current ILDR, the states of the controllable switches SW1, . . . , SW7, and the potential of the sensing voltage VSENSE which drops at resistor R2 at internal node N6, the potential of the comparing signal VOUT1 at internal node N3 at the output O_AMP1 of the first amplifier AMP1 and the potentials of the output signal VOUT2 at internal node N4 and of the control signal VGATE which is applied to the gate terminal of transistor MN at internal node N5.

The controllable switches SW1, . . . , SW7 may be controlled by the control circuit 20 such that the output current ILDR is periodically turned on and off. The switchable current source may generate pulses of the output current alternating between a high and low level.

When the switchable current source is in the "on state", i.e. the switches SW3, SW4 and SW7 are in a conductive or closed state and the switches SW1, SW2, SW5 and SW6 are in a non-conductive or open state, the internal nodes N1, N2 and N6 are in the same voltage level so that the voltage of the sensing signal VSENSE, the voltage of the reference signal VREF and the voltages of the input signals VPOS, VNEG are in the same voltage level. The potential of the comparing signal Vout1 at the internal node N3, the potential of the output signal Vout2 at internal node N4 and the potential of the control signal VGATE at internal node N5 are in normal operational voltage levels. The output current ILDR is regulated at a constant level by the closed loop of the feedback path FP even when the outside loading condition at the output terminal LDR_PIN is changing.

When the switchable current source is in the "off state", i.e. the controllable switches SW3, SW4 and SW7 are in a non-conductive state and the controllable switches SW1, SW2, SW5 and SW6 are in a conductive state, there is no current going through sense resistor R2 so that the voltage of the sensing signal VSENSE across R2 is reduced to zero. To minimize this interference to the regulator input terminals E1_RC, E2_RC during the "off state" of the switchable current source, the switch SW1 is switched in a conductive state and the switch SW3 is switched in an open state, i.e. a non-conductive state, such that the potential of the input signal VPOS at the input terminal E1_RC is still in the same voltage level as the potential of the reference signal VREF. Further, to minimize the input common mode voltage variation of first amplifier AMP1, although the input terminal E2_RC is always connected to the reference voltage VREF, dummy switches SW2, SW7 are provided to match switches SW1, SW3 connected to the input terminal E1_RC of the regulator circuit.

When the switchable current source transits from the "off state" to the "on state", the voltage of the input signal VPOS at the input terminal E1_RC will go from the high potential VREF to the low potential VSENSE which is close to ground initially. To cope with this input transition, the output side O_AMP1 of the first amplifier AMP1 is clamped to a higher voltage VOUT1_CLAMP when the switchable current source is in the "off state". The clamping of the output side O_AMP1 during the "off state" will be released for transition to the "on state". The clamping at the output side O_AMP1 of the first amplifier AMP1 is consistent to the clamping of the input terminal E1_RC: When the clamping is released at the end of the "off state", the potential of the input voltage VPOS at the input terminal E1_RC is going from high to low, so is the potential of the comparing signal VOUT1 at the output side O_AMP1. Also, the clamping at the output side O_AMP1 is consistent with the clamping of the control terminal C_MN of the output driver: When the output side O_AMP1 is clamped to a higher voltage, the output terminal O_RC of the second amplifier AMP2 is driven/clamped to ground level GND during the "off state". The potential of the control voltage VGATE at the control terminal C_MN is shut off to ground level during the "off state" of the switchable current source.

In summary, the above-described clamping-assisted regulation scheme enables that the potential at the internal nodes N1, . . . , N6 of the circuit rise/fall monotonically during transition from the "off state" back to the "on state" of the switchable current source. This monotonicity is critical to enable the output current transition from "off state" to "on state" without overshoot or ringing.

In addition, an independent slew control scheme is built into the above-described clamping-assisted regulation scheme. A resistor/capacitor network R3/C1 is provided in front of the gate terminal C_MN of the output driver MN. When the switchable current source transits from the "on state" to the "off state", the controllable switch SW4 disconnects the regulator circuit RC from the output driver MN, and the switch SW5 shuts off the output driver MN through resistor/capacitor R3/C1. This is an independent slew control during a falling edge of the output current pulse.

When the switchable current source transits from the "off state" to the "on state", the internal circuit nodes N1, ..., N6 rise/fall monotonically so that there is no overshoot/ringing at the regulator output terminal O_RC. Therefore, the slew rate of the output current rising edge is still controlled by the resistor/capacitor network R3/C1 with some contribution from the internal compensation network of second amplifier AMP2.

The single transistor exposure to output terminal LDR_PIN simplifies the design, reduces electrostatic discharge damage, saves silicon area and reduces material costs. The grounded sense resistor R2 isolates the switchable current source from potential external higher voltages at the output terminal LDR_PIN. This enables the usage of a low voltage regulation amplifier. In general, a low voltage device requires less manufacturing so that the manufacturing costs are reduced. Furthermore, if the output driver MN is realized by an NMOS transistor, only the NMOS drain of the NMOS transistor is exposed to a higher external voltage so that a wide range of the externally applied voltage VDDLDR can be achieved which is a typical requirement for optical proximity sensor applications. The grounded reference resistor R1 has mainly two benefits: A wide trimming current Itrim can be used since the resistor R1 is connected to ground potential GND. The matching between the reference resistor R1 and the sense resistor R2 becomes less critical since the reference current will be trimmed anyway. The clamping-assisted regulation scheme clamps four sets of internal nodes during the "off state": The input terminal E1_RC of the regulator circuit RC at internal node N1 is clamped at the reference voltage VREF; the voltage of the comparing signal VOUT1 at the output terminal O_AMP1 of the first amplifier AMP1 at the internal node N3 is clamped at the higher voltage level VOUT1_CLAMP, the voltage of the output signal VOUT2 of the second amplifier AMP2 at the output terminal O_RC of the regulator circuit at internal node N4 is driven/clamped at ground, and the gate voltage VGATE at the control terminal C_MN of the output driver MN at internal node N5 is clamped at ground potential through the controllable switch SW5.

The matching switches SW1, SW2, SW3 and SW7 at the regulator input are critical to system operation. These matching switches minimize the switching interference on the most sensitive portion, i.e. virtual ground of the regulator circuit RC during transition from the "off state" to the "on state". The slew control scheme is independent on the loop regulation. When the loop is shut off the falling edge slew rate is controlled by the resistor/capacitor network R3/C1. When the loop is turned on, due to the internal clamping, there is no overshoot/ringing at the regulator output O_RC. The rising edge slew rate is still controlled by the resistor/capacitor network. The output driver control switches SW4/SW5 enable to reduce the delay from an input pulse change to an output current pulse change: The controllable switch SW4 disconnects the regulator circuit RC, and the controllable switch SW5 shuts off the output driver without any interruption of the regulation loop.

The switchable current source has wide applications from switched mode power supply to LED drivers. One particular application is that of optical proximity sensors. Optical proximity sensors require a special infrared LED driver which enables a wide current trimming range to trim out infrared LED variation, a wide external voltage compliance for different mobile batteries and a fast response time to LED pulse input change for synchronized proximity engine operation. The switchable current source described above solves the three problems and meets the production requirement in massive optical proximity sensor markets. The switchable current source enables a wide trimming current range, for example 400% current trimming range, and a wide external voltage range, for example 0.5 V to 5.5 V.

Although specific terms are employed in the description, they are used in a generic and descriptive sense only and not for purposes of limitation. Many modifications and other embodiments set forth herein will come to mind to one skilled in the art to which the embodiments pertain having the benefit of the teachings presented in the foregoing descriptions and the associated drawings. Therefore, it is to be understood that the description and the claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents.

The invention claimed is:

1. An electric circuit of a switchable current source, comprising:
    an input current path with a controllable current source to feed a changeable current to the input current path;
    an output terminal to provide an output current;
    an output current path being connected to the output terminal;
    a regulator circuit having a first input terminal to apply a first input signal and a second input terminal to apply a second input signal and an output terminal to provide an output signal, wherein the regulator circuit is arranged to provide an output signal in dependence on a comparison of the first and second input signals;
    a controllable output driver being controlled in dependence on the output signal, wherein the controllable output driver is arranged to change the output current in dependence on the output signal; and
    a feedback path coupled between the output current path and the first input terminal,
    wherein the first input terminal of the regulator circuit is connectable to the input current path and the feedback path,
    wherein the second input terminal of the regulator circuit is connectable to the input current path,
    wherein the regulator circuit comprises a first amplifier and a second amplifier,
    wherein the first amplifier has an input side including the first and second input terminals and an output side to provide a comparing signal, the first amplifier being arranged to compare the first and second input signals of the regulator circuit and to provide the comparing signal in dependence on the comparison of the first and second input signals of the regulator circuit, and
    wherein the second amplifier has an input side to apply the comparing signal and an output side to provide the output signal.

2. The electric circuit as claimed in claim 1, comprising:
    a first resistor being arranged in the input current path such that a reference voltage drops at the first resistor, wherein the reference voltage is dependent on the changeable current and the resistance of the first resistor.

3. The electric circuit as claimed in claim 2, comprising:
a first controllable switch being connected between the input current path and the first input terminal to apply the reference voltage tapped at the input current path to the first input terminal, when the first controllable switch is switched in a conductive state; and
a second controllable switch being connected between the input current path and the second input terminal to apply the reference voltage to the second input terminal, when the second controllable switch is switched in a conductive state.

4. The electric circuit as claimed in claim 3, comprising:
a third controllable switch being arranged in the feedback path to apply a sensing voltage tapped at the output current path to the first input terminal.

5. The electric circuit as claimed in claim 4, comprising:
a second resistor being arranged in the output current path such that the sensing voltage drops at the second resistor, wherein the sensing voltage is fed back to the first input terminal, when the third controllable switch is in a conductive state.

6. The electric circuit as claimed in claim 5, comprising:
a fourth controllable switch being connected between the output terminal of the regulator circuit and a control terminal of the controllable output driver.

7. The electric circuit as claimed in claim 6, comprising:
a third resistor being connected between the output terminal of the regulator circuit and the control terminal of the controllable output driver to apply a control signal;
a capacitor being connected between the control terminal of the controllable output driver and a reference potential; and
a fifth controllable switch being connected between the control terminal of the controllable output driver and the reference potential such that the control terminal of the controllable output driver is applied to a ground potential via the third resistor, when the fifth controllable switch is switched in a conductive state.

8. The electric circuit as claimed in claim 7, comprising:
a sixth controllable switch being connected to a supply potential to apply the supply potential to the input side of the second amplifier.

9. The electric circuit as claimed in claim 8, comprising:
a seventh controllable switch being connected between the input current path and the second input terminal such that a reference voltage is applied to the second input terminal, when the seventh controllable switch is switched in a conductive state.

10. An electric circuit of a current regulator, comprising:
the electric circuit of a switchable current source as claimed in claim 9; and
a control circuit to control the electric circuit of the switchable current source by controlling the controllable switches of the switchable current source,
wherein the control circuit is arranged to switch the third, fourth, and seventh controllable switches in a conductive state and to switch the first, second, fifth, and sixth controllable switches in a non-conductive state during a first operational mode of the electric circuit of the switchable current source to generate the output current,
wherein the control circuit is arranged to switch the third, fourth, and seventh controllable switches in the non-conductive state and to switch the first, second, fifth, and sixth controllable switches in the conductive state during a second operational mode of the electric circuit of the switchable current source in which the output current is turned off.

11. An electric circuit of a current regulator, comprising:
the electric circuit of a switchable current source as claimed in claim 8; and
a control circuit to control the electric circuit of the switchable current source by controlling the controllable switches of the switchable current source,
wherein the control circuit is arranged to switch the second, third, and fourth controllable switches in a conductive state and to switch the first, fifth, and sixth controllable switches in a non-conductive state during a first operational mode of the electric circuit of the switchable current source to generate the output current,
wherein the control circuit is arranged to switch the first, second, fifth, and the sixth controllable switches in the conductive state and to switch the third and fourth controllable switches in the non-conductive state during a second operational mode of the electric circuit of the switchable current source in which the output current is turned off.

12. A module to provide a switchable light signal of a light emitting diode, comprising:
an electric circuit of a current regulator as claimed in any of claims 11 or 10;
a light emitting diode; and
a power supply terminal to supply power,
wherein the light emitting diode is connected between the output terminal of the electric circuit of the switchable current source and the power supply terminal.

13. The module as claimed in claim 12,
wherein the light emitting diode is formed as an infrared light emitting diode.

14. The electric circuit as claimed in claim 1,
wherein the controllable output driver is configured as a transistor.

* * * * *